United States Patent [19]
Mayer et al.

[11] Patent Number: 5,255,849
[45] Date of Patent: Oct. 26, 1993

[54] COOLING AIR TRANSFER APPARATUS FOR AIRCRAFT GAS TURBINE ENGINE EXHAUST NOZZLES

[75] Inventors: Jeffrey C. Mayer, Swampscott; Robert P. Sim, Topsfield, both of Mass.; Ananta K. Gopalan, Hampton, N.H.

[73] Assignee: General Electric Company, Cincinnati, Ohio

[21] Appl. No.: 787,869

[22] Filed: Nov. 5, 1991

[51] Int. Cl.$^5$ ............................................. B64D 33/04
[52] U.S. Cl. ................................... 239/127.3; 60/266
[58] Field of Search ...................... 239/127.1, 127.3; 137/615, 891; 285/41, 10, 11; 60/266

[56] References Cited

U.S. PATENT DOCUMENTS

| | | | |
|---|---|---|---|
| 3,374,954 | 3/1968 | Card | 239/127.1 |
| 3,595,023 | 7/1971 | Stockel | 239/127.3 |
| 3,979,065 | 9/1976 | Madden | 239/127.3 |
| 4,081,137 | 3/1978 | Sutton et al. | 239/127.3 |
| 4,098,076 | 7/1978 | Young et al. | 60/230 |
| 4,203,286 | 5/1980 | Warburton | 60/266 |
| 4,544,098 | 10/1985 | Warburton | 239/127.3 |
| 4,643,356 | 2/1987 | Holler et al. | 60/266 |
| 4,756,053 | 7/1988 | Madden et al. | 16/223 |

FOREIGN PATENT DOCUMENTS

| | | | |
|---|---|---|---|
| 0826059 | 5/1981 | U.S.S.R. | 60/266 |
| 2235728 | 3/1991 | United Kingdom | 239/127.3 |

Primary Examiner—Andres Kashnikow
Assistant Examiner—Christopher G. Trainor
Attorney, Agent, or Firm—Jerome C. Squillaro; Nathan D. Herkamp

[57] ABSTRACT

A cooling air transferring apparatus is provided particularly for transferring cooling air from hollow convergent flaps and seals to hollow divergent flaps and seals respectively in aircraft gas turbine engine variable nozzles. The preferred embodiment includes two semi-circular tubes, the first partially received within the second and both having a common center and radius of curvature so as to slide about the pivot point of the variable nozzle's pivotable convergent and divergent flaps and seals. The preferred embodiment further includes an entrainment opening on the second tube through which part of the first tube is received. The entrainment opening induces cooling air from the nozzle bay into the cooling air transfer tube to help cool the divergent flaps and seals.

11 Claims, 3 Drawing Sheets

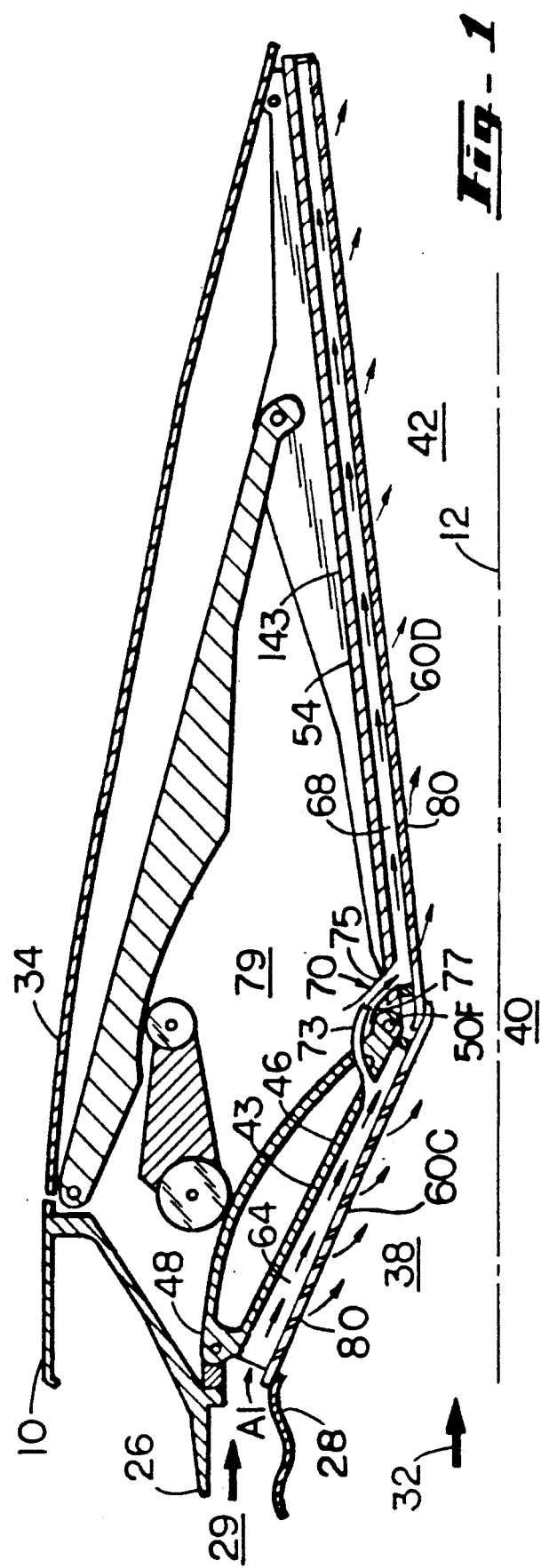

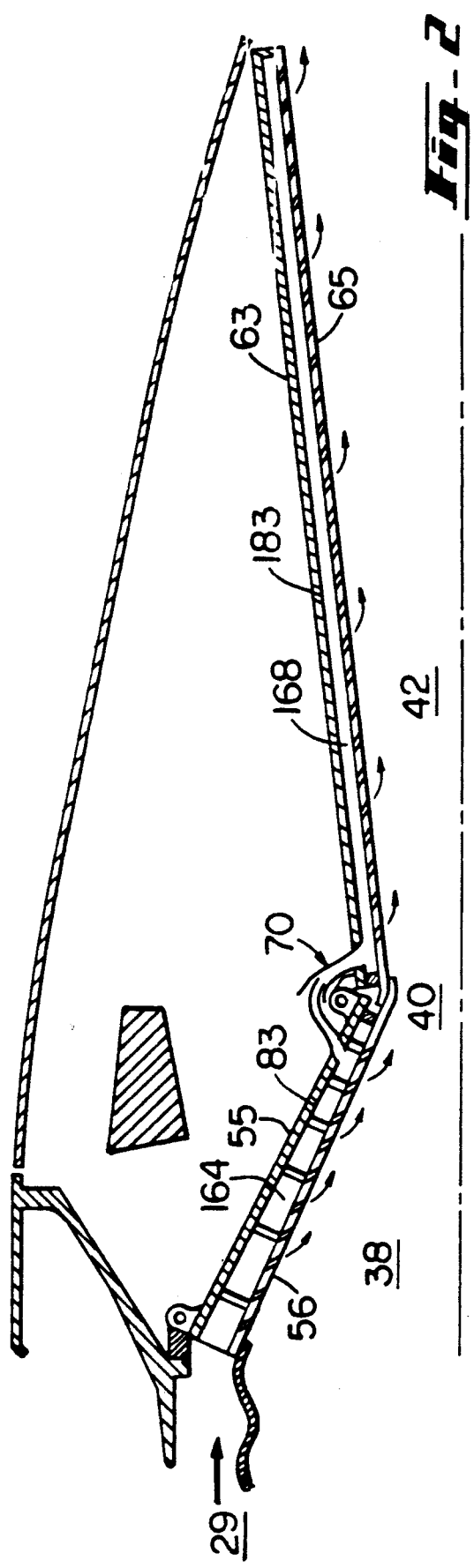

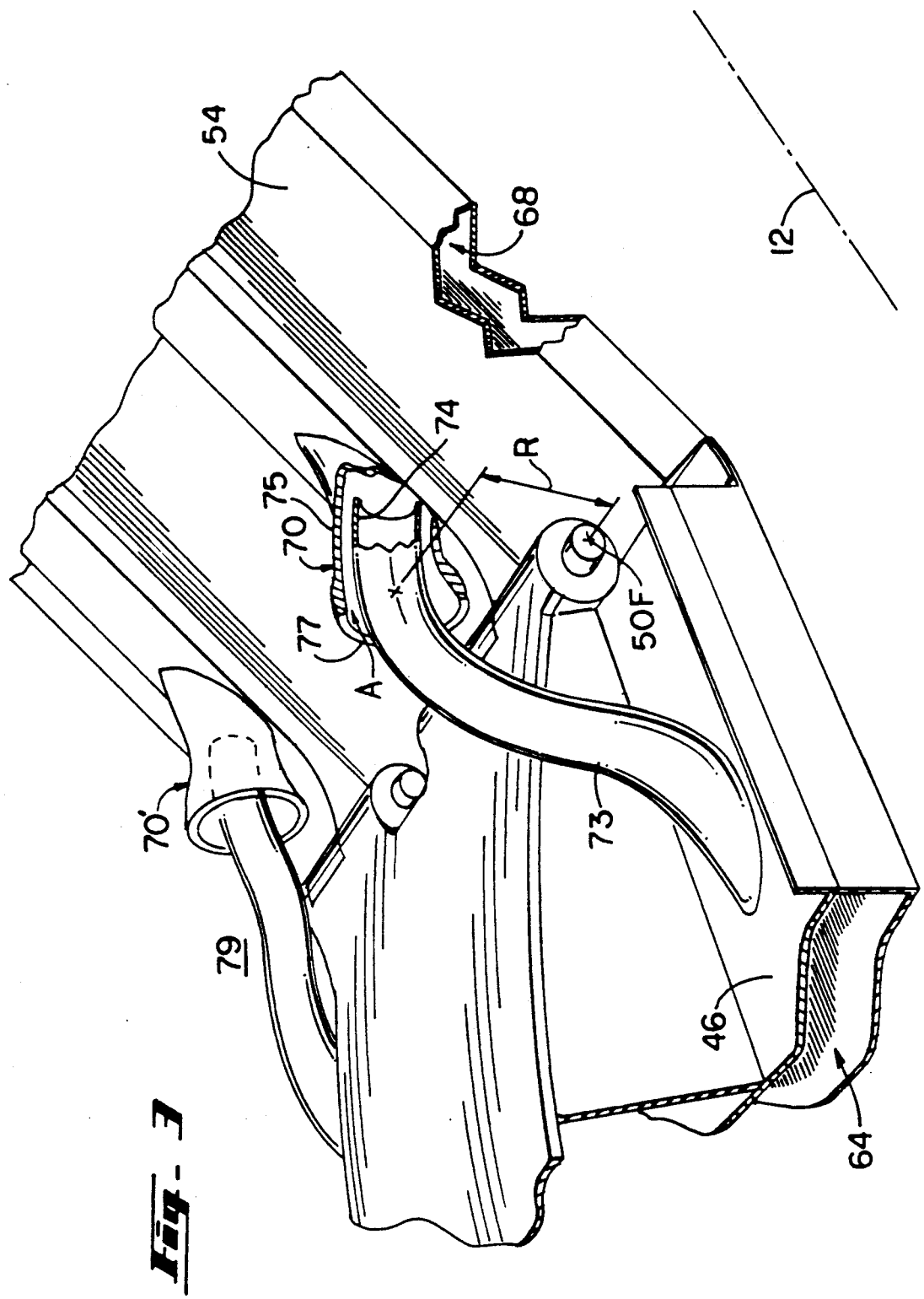

COOLING AIR TRANSFER APPARATUS FOR AIRCRAFT GAS TURBINE ENGINE EXHAUST NOZZLES

BACKGROUND OF THE INVENTION

1. Field of the Invention

This invention relates to the cooling of aircraft gas turbine engine exhaust nozzles and more particularly to means for transferring cooling air to cooling air passages of pivotable flaps and seals in a variable throat area exhaust nozzle.

2. Description of Related Art

Aircraft gas turbine engines, particularly of the turbo-jet and turbo-fan types, employ exhaust nozzles having containment members, namely flaps and seals, that are used to contain the hot exhaust flow and produce thrust to propel the aircraft. Cooling of the nozzle is often required in order to provide thermal protection for the nozzle and the rest of the engine. Cooling also helps reduce the infrared signature of the engine and aircraft which is particularly important for military aircraft.

Military aircraft gas turbine engines often employ variable exhaust nozzles having pivotable flaps and seals incorporating liners that are cooled by film or convective cooling or a combination of both. An example of such a nozzle cooling scheme is shown in Warburton U.S. Pat. No. 4,544,098 entitled "Cooled Exhaust Nozzle Flaps" and Sutton et al. U.S. Pat. No. 4,081,137 entitled "Finned Surface Cooled Nozzle". Sutton discloses a convergent/divergent exhaust nozzle having double wall hollow flaps wherein cooling air is supplied to a passage between the double walls and flowed therethrough thereby convectively cooling the hot wall. Sutton further provides outlets for introducing cooling air into the boundary layer to provide film cooling of the hot wall.

Warburton discloses convectively cooled convergent flaps that supply cooling air to respective divergent flaps of an axisymmetric exhaust nozzle. The divergent flaps are film cooled by the cooling air used to convectively cool the convergent flaps, wherein the cooling air is exhausted onto the hot surface of the divergent flap.

As can be seen from these examples of prior art nozzles, containment members are generally hollow having liners that employ, either alone or in combination, means for convective or film cooling. Film cooling means for these liners typically employ slots to introduce film cooling air over what is often a rather extensive axially extending portion of nozzle liner.

One problem associated with the prior art nozzle liner cooling concepts described in the aforementioned patents is that neither the convective cooling nor the slot means for film cooling is a very efficient method of cooling the hot liner surfaces. More efficient methods of cooling would allow the engine to use less cooling air thereby providing savings of weight, cost, and fuel and would also permit the engine to be operated at a higher level of thrust.

Besides requiring greater amounts of cooling air to thermally protect the liners and respective nozzle parts, the prior art liner cooling means cause uneven cooling in the axial direction, subjecting the liners to larger temperature gradients from upstream to downstream ends, particularly during afterburning, creating stresses which can reduce life of the nozzle.

Engine designers are constantly seeking means to reduce the use of expensive, in terms of thrust and fuel consumption, cooling air and strive to reduce, as much as possible, the amount of cooling air used to cool the liners. Slot type film cooling uses relatively large amounts of cooling air as compared to the present invention.

To that end, a nozzle having hollow convergent and divergent flaps and seals was developed as disclosed in related U.S. patent application Ser. No. 07/787,983 entitled "COOLING APPARATUS FOR AIRCRAFT GAS TURBINE ENGINE EXHAUST NOZZLES", invented by John W. Vdoviak et al., filed Nov. 5, 1991, assigned to the same assignee as the present invention, and incorporated herein by reference.

The present invention provides a means to effectively transfer cooling air between relatively pivotable hollow flow containment members, such as respective hollow convergent and divergent flaps and seals. The present invention also provides a supplemental cooling air ejector means to entrain additional air from the engine nozzle bay for cooling the containment members in order to save costly compressor or fan cooling air.

SUMMARY OF THE INVENTION

The present invention provides a cooling fluid transfer means between relatively pivotable cooling fluid sources and receivers which, for an exhaust nozzle, are the relatively pivotable containment members in the form of hollow convergent and divergent flaps and seals. The fluid transfer apparatus of the present invention, as illustrated herein, provides a means to transfer cooling air from a convergent flap cooling air passage to a divergent flap cooling air passage via a circular slidable connector having a first circularly curved tube in fluid communication with one flap cooling air passage and a second tube in fluid communication with the other flap cooling air passage wherein one of the tubes is slidably received within the other tube and both tubes have the same radius of curvature having its origin at the pivot line between the convergent and divergent flaps.

The present invention also contemplates the use of the transfer apparatus between hollow exhaust nozzle convergent and divergent seals in a similar manner as that for convergent and divergent flaps. Circular curved tubes may have a circular or other cross section, such as rectangular, in the direction of the cooling fluid flow. Furthermore, the present application may be used in two dimensional or other types of non-axisymmetric nozzles as well as in axisymmetric nozzles as illustrated herein.

The preferred embodiment of the present invention provides a cooling air ejector means to induce cooling air from the engine nozzle bay to supplement cooling air from the compressor or fan of the engine. In the particular embodiment illustrated herein, the ejector means includes an outer tube having a flared inlet for receiving an inner tube. The flared inlet is large enough and aerodynamically shaped which together with the spaced apart concentrically disposed inner tube provides an ejector means to draw in cooling air from the engine nozzle bay.

ADVANTAGES

Gas turbine engine nozzle hollow convergent flaps and seals having cooling air transfer and ejector means in accordance with the present invention provide an efficient and effective means of transferring cooling air between relatively pivotable hollow flaps and seals that are hinged together. The ejector means of the cooling air transfer device saves relatively expensive cooling air, usually fan air or compressor air, that is used to cool the nozzle. This reduction in the amount of cooling air used allows an aircraft powered by an engine employing the present invention may be operated more efficiently, over longer distances, and at higher thrust levels than would otherwise be possible.

BRIEF DESCRIPTION OF THE DRAWING

The foregoing aspects and other features of the invention are explained in the following description, taken in connection with the accompanying drawings where:

FIG. 1 is a diagrammatic cross-sectional view through the flaps of a nozzle having a cooling air transfer and ejector apparatus in accordance with the preferred embodiment of the present invention.

FIG. 2 is a diagrammatic cross-sectional view through the interflap seals of a nozzle having a cooling air transfer and ejector apparatus in accordance with the preferred embodiment of the present invention.

FIG. 3 is a partial cutaway perspective view of a nozzle flap assembly including preferred embodiment of the cooling air transfer and ejector apparatus in FIGS. 1 and 2.

DETAILED DESCRIPTION OF THE INVENTION

FIG. 1 illustrates an aft portion of an afterburning exhaust section 10 of aircraft gas turbine engine circumferentially disposed about an engine centerline 12. Exhaust section 10 includes an annular case 26 and an annular afterburner liner 28 radially inward of case 26 forming an afterburner cooling flowpath 29 therebetween for containing a hot exhaust gas flow 32. A variable exhaust nozzle 34 is circumferentially disposed about engine centerline 12 downstream of afterburner liner 28 and is operable to receive cooling air from afterburner cooling flowpath 29.

Nozzle 34 includes, in serial flow relationship, a convergent section 38, a variable area throat 40 and a divergent section 42. Nozzle 34 includes a circumferentially disposed plurality of convergent hollow flaps 46 pivotally connected at the forward end 48 to casing 26. Convergent flap 46 is pivotally connected at its aft end, at a flap pivot point 50F, to a respective divergent flap 54 thereby forming throat 40 therebetween. The circumferential spaces between flaps are sealed by interflap convergent and divergent hollow seals 55 and 63 shown in FIG. 2.

Referring again to FIG. 1, in order to protect the nozzle from thermal degradation due to hot gas flow 32, convergent and divergent flaps 46 and 54 are provided with respective flap liners 60C and 60D spaced apart from convergent and divergent flap cool walls 43 and 143 forming respective cooling passages 64 and 68 therebetween. Liners 60C and 60D include multihole film cooling means indicated by multihole film cooling holes 80. Cooling air is received from afterburner cooling air flowpath 29 and supplied to convergent flap cooling air passage 64 which feeds cooling air to divergent flap cooling air passage 68 through a cooling air transfer means generally shown at 70. The preferred embodiment of the present invention contemplates the use of a second cooling air transfer means illustrated as 70' in FIG. 3. Flap and liner assemblies having cooling air passages therebetween, as described above, may also be referred to as hollow flaps and may be cast as a unitary part. Convergent flap cooling air passage 64 converges in the downstream cooling flow direction which is in the same direction as hot exhaust gas flow 32.

Referring to FIG. 2, convergent and divergent seals 55 and 63 are provided with respective seal liners 56 and 65 spaced apart from convergent and divergent seal cool walls 83 and 183 respectively, forming respective convergent and divergent seal cooling passages 164 and 168 therebetween. Cooling air is received from afterburner cooling air flowpath 29 and used for film cooling the seals in the same manner as the convergent and divergent flaps in FIG. 1.

Referring to FIG. 3, the present invention provides a cooling air transfer means 70, as shown in FIG. 1, having a convergent flap transfer tube 73 operable to receive cooling air from convergent flap cooling air passage 64 and having an aft portion 74 slidably engaged within a divergent flap transfer tube 75 which conveys the cooling air to divergent flap cooling air passage 68. Convergent flap transfer tube 73 and divergent flap transfer tube 75 are configured about flap pivot point 50F between convergent and divergent flaps 46 and 54 respectively such that their common radius of curvature R has its origin along the pivot line coincident with flap pivot point 50F. This is so that, as divergent flap 54 pivots with respect to convergent flap 46, convergent flap transfer tube 73 slides within divergent flap transfer tube 75. Though both tubes might typically have circular cross sections with respect to a plane perpendicular to engine centerline 12, it is contemplated that they may have otherwise shaped axially facing cross sections.

Divergent flap transfer tube 75 has an ejector like inlet 77 and an inner diameter that is sufficiently larger than the outer diameter of convergent flap transfer tube 73 in order to slidably receive convergent flap transfer tube 73 and to induce supplemental cooling air into divergent transfer tube 75 from engine nozzle bay 79. Ejector like inlet 77 is aerodynamically shaped or flared, to enhance its entrainment means function to draw in cool air from nozzle bay 79 which is in fluid communication with aircraft engine bay air.

An entrainment means is provided by a fluid communication path comprising flared ejector like inlet 77 and the annular space A between divergent flap transfer tube 75 and convergent flap transfer tube 73 to the cooling air coming out of convergent flap transfer tube 73. The entrainment means draws in cooling from nozzle bay 79 and entrains it with the cooling air transferred from convergent flap cooling air passage 64 through convergent flap transfer tube 73. A similar cooling air transfer means 70 and associated entrainment means is provided for the seals as indicated in FIG. 2.

While the preferred embodiment of our invention has been described fully in order to explain its principles, it is understood that various modifications or alterations may be made without departing from the scope of the invention as set forth in the appended claims.

We claim:

1. A fluid transfer apparatus for transferring a primary fluid between relatively pivotable fluid source and receiver, said fluid transfer apparatus comprising:

a curved source transfer tube attached to and pivotable with the fluid source and operable to receive and transfer the primary fluid from the fluid source, a curved receiver transfer tube attached to and pivotable with the fluid receiver, wherein said receiver fluid transfer tube receives in slidable relation a portion of said fluid source transfer tube such that primary fluid may be transferred from the fluid source to the fluid receiver, and the relatively slidable portions of said transfer tubes concentrically curve about a relative pivot point between said relatively pivotable fluid source and receiver.

2. A fluid transfer apparatus as claimed in claim 1 further comprising:

a supplemental fluid entrainment means at an inlet to said receiver transfer tube to entrain supplemental fluid into said receiver transfer tube for supply to the receiver wherein said receiver transfer tube is in slidable receipt, through said inlet, of said portion of said source transfer tube.

3. A fluid transfer apparatus as claimed in claim 2 wherein said fluid entrainment means comprises said receiver tube inlet having a cross section sufficiently large and aerodynamically shaped so as to draw in a supplemental fluid.

4. A fluid transfer apparatus as claimed in claim 3 wherein said receiver tube inlet has a circular cross section.

5. An interflap cooling air transfer apparatus for transferring cooling air between cooling air passages of pivotably connected convergent and divergent hollow flaps, said cooling air transfer apparatus comprising:

a convergent flap transfer tube operable to receive cooling air from the convergent flap cooling air passage, a divergent flap transfer tube for conveying the cooling air to the divergent flap cooling air passage and in slidable receipt of a portion of said convergent flap transfer tube, and the relatively slidable portions of said tubes being concentrically curved about a pivot point between the convergent and divergent flaps.

6. An interflap cooling air transfer apparatus as claimed in claim 5 further comprising an entrainment means disposed at an inlet to said divergent flap transfer tube for drawing in cooling air exterior to the flaps.

7. An interflap cooling air transfer apparatus as claimed in claim 6 wherein said entrainment means comprises a flared inlet on said divergent flap transfer tube in slidable receipt of said portion of said convergent flap transfer tube and aerodynamically shaped to draw supplemental cooling air into said divergent flap transfer tube.

8. An interflap cooling air transfer apparatus as claimed in claim 7 further including a nozzle bay source of supplemental cooling air in flow communication with said entrainment means.

9. A coolable nozzle flap assembly for an aircraft gas turbine engine, said coolable nozzle flap assembly comprising:

a convergent flap pivotally connected to the engine, a coolable liner spaced apart from and attached to said convergent flap so as to form a convergent cooling air passage therebetween, said coolable liner having a coolable wall including a hot side and a cold side, a multi-hole film cooling means disposed on said coolable wall for cooling said hot surface, wherein said multi-hole film cooling means comprises at least one pattern of small closely spaced film cooling holes angled sharply in the downstream direction from said cold side to said hot side, a divergent flap pivotably connected to said convergent flap, a coolable divergent flap liner spaced apart from and attached to said divergent flap so as to form a divergent cooling air passage therebetween, said divergent flap coolable liner having a second coolable wall including a second hot side and a second cold side, a multi-hole film cooling means disposed on said second coolable wall for cooling said second hot surface, wherein said multi-hole film cooling means comprises at least one pattern of small closely spaced film cooling holes angled sharply in the downstream direction from said cold side to said hot side, an interflap cooling air transfer apparatus disposed in fluid transfer communication between said flaps, said interflap cooling air transfer apparatus including:

a convergent flap transfer tube operable to receive cooling air from said convergent flap cooling air passage, a divergent flap transfer tube for conveying the cooling air to said divergent flap cooling air passage and in slidable receipt of a portion of said convergent flap transfer tube, said relatively slidable portions of said tubes being concentrically curved about a pivot point between the convergent and divergent flaps, and an entrainment means disposed at an inlet to said divergent flap transfer tube for drawing in cooling air exterior to the flaps.

10. A coolable nozzle flap assembly as claimed in claim 9 wherein said entrainment means comprises said inlet on said divergent flap transfer tube in slidable receipt of said portion of said convergent flap transfer tube and aerodynamically shaped to draw cooling air into said divergent flap transfer tube.

11. A coolable nozzle flap assembly as claimed in claim 10 wherein said entrainment means is operable to draw cooling air from a nozzle bay.

* * * * *